(12) United States Patent
Niyogi et al.

(10) Patent No.: US 6,345,110 B1
(45) Date of Patent: *Feb. 5, 2002

(54) IDENTIFYING IMAGES USING A TREE STRUCTURE

(75) Inventors: Sourabh A. Niyogi, Cambridge; William T. Freeman, Acton, both of MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,391

(22) Filed: May 27, 1999

Related U.S. Application Data

(63) Continuation of application No. 08/729,600, filed on Oct. 11, 1996, now Pat. No. 6,144,755.

(51) Int. Cl.$^7$ .................................................. G06K 9/00
(52) U.S. Cl. ........................................ 382/118; 382/226
(58) Field of Search ................................ 382/100, 115, 382/116–118, 155, 159, 181, 2.3, 209, 216, 218, 219, 239, 240, 305, 226; 348/414, 422; 704/222

(56) References Cited

U.S. PATENT DOCUMENTS

| | | | |
|---|---|---|---|
| 5,255,090 A | | 10/1993 | Israelson ..................... 358/133 |
| 5,450,504 A | * | 9/1995 | Calia .......................... 382/118 |
| 5,561,718 A | * | 10/1996 | Trew et al. ................. 382/118 |
| 5,608,387 A | * | 3/1997 | Davies .................. 340/825.34 |
| 5,642,431 A | | 6/1997 | Poggio et al. .............. 382/118 |
| 5,764,790 A | | 6/1998 | Brunelli et al. ............ 382/118 |
| 5,835,616 A | | 11/1998 | Lobo et al. ................. 382/118 |
| 6,173,275 B1 | * | 1/2001 | Caid et al. .................... 706/14 |

OTHER PUBLICATIONS

IEEE Proceedings–1, vol. 139, No. 1, Feb. 1992, "Image Sequence Coding Using Adaptive Tree–structured Vector Quantisation with Multipath Searching", Chang et al, pp. 9–14.*

Proceedings, IEEE CVPR, 1993, "Recursive Estimation of Structure and Motion Using the Relative Orientation Constraint", by Messrs. Azarbayejani Horowitz and Pentland.

Tracking Facial Motion, IEEE Computer Society, 1994, Proceedings of the Workshop on Motion of Non–rigid and Articulated Objects, pp 36–42, by Messrs. Esa, Darrell and Pentland.

Proceedings, IEEE 1994, Computer Society Conference on Computer Vision and Pattern Recognition, pp. 84–91, View –Based and Modular Eigenspaces for Face Recognition, Pentland et al.

Digital Image Compression Techniques, pp 146–151, Rabbani et al.

Pattern Recognition Principles, pp 169–170, Tou er al.

* cited by examiner

*Primary Examiner*—Jayanti K. Patel
(74) *Attorney, Agent, or Firm*—Dirk Brinkman; Andrew J. Curtin

(57) ABSTRACT

To identify an image characteristic, a tree structured code having coding representing each of a plurality of training images is stored in a memory. Coding representing a sample image, not included in the plurality of training images, is compared to the tree structured code to identify the training image coding in the structured tree code closest to the sample image coding. A characteristic of the sample image is identified based upon the training image represented by the closest training image coding.

27 Claims, 2 Drawing Sheets

IDENTIFYING IMAGES USING A TREE STRUCTURE

This application is a continuation of application Ser. No. 08/729,600 filed on Oct. 11, 1996 now U.S. Pat. No. 6,144,755.

FIELD OF THE INVENTION

The present invention relates to a system for determining poses of a test subject. More particularly, it relates to determining a direction the head of a driver of an automobile is facing.

BACKGROUND OF THE INVENTION

Operator error is a principal cause of automobile accidents. Different methods have been developed to alert drivers of dangerous conditions in order to prevent errors. As part of such systems, the driver is monitored to determine the driver's state, and whether the driver is paying proper attention to conditions of the road and vehicle. Typically, this is done by including a camera in the vehicle to take a picture of the driver. The picture is then analyzed to determine features and characteristics of the driver, such as whether the eyes are open and which way the driver is looking. The difficulty is in developing a system for analyzing the picture of the driver which operates with different drivers, different lighting conditions, and different driver positions.

Various techniques have been developed for analyzing images of a driver. In order to be useful, a technique must be quick and economical. It must be analyze a picture quickly in order to alert the driver of the dangerous condition and allow time for an appropriate response. In addition, it must be economical to build so that it is affordable within an automobile Techniques which use large amounts of memory or require high speed processors are not sufficiently economical.

In a feature extraction technique, the image is analyzed to determine specific facial features of the driver. Generally, an objective is to determine the size, shape, and position of the eyes. Features are abstracted from the image based upon the light and dark areas in the image. However, with different drivers and lighting conditions, the light and dark areas, particularly around the eyes, can vary greatly. Thus, determining the feature is difficult and requires significant processing. An example of a feature determining and tracking system is illustrated in "Recursive Estimation of Structure and Motion Using the Relative Orientation Constraint", *Proceedings IEEE CVPR*, 1993, by Messers. Azarbayejani Horowitz, and Pentland.

In another technique, templates representing face or feature structures are used in determining head position and orientation. The image is compared with the various templates to determine which one is closest. An example of a template matching system is illustrated in "Tracking Facial Motion", *Proceedings of the-Workshop on Motion of Non-rigid and Articulated Objects,* app 36–42, TERE Computar Society 1994, by Messrs. Essa, Darreil, and Pentland. The significant differences in driver images resulting from different drivers, different lighting conditions, and different appearances, makes matching with templates difficult. Furthermore, in performing the matching, significant processing is required to compare an image with each of the templates. Thus, more powerful and faster processors are required, which increases the expense.

In another technique, optical flow is used to determine positions of features and assumes small head movements. An example of the optical flow technique is shown in "Analysis and Synthesis of Facial Image Sequences Using Physical and Anatomical Models", *IEEE Pat. Anal. Mach. Intell.,* 15(6): 569–579, June 1993 by Messrs. Terzopoulus and Waters. In the optical flow technique, the sequence of images are used to follow features and determine a change in position from one image to the next. This requires fast processing so that the head movements between images are small. It also requires significant, processing power in order to meet these processing speed requirements.

Thus, a need exists for a rapid and low cost image analysis system for determining head position and pose of the driver. A need exists for a system which accomodates different subjects, appearances, and lighting. A need exists for a system which does not require high speed processing.

SUMMARY OF THE INVENTION

The present invention uses a non-linear mapping technique to map a sample image to a set of output model parameters. The model parameters principally relate to pose or head position. A training set of images and corresponding model parameters is used to learn the mapping from the inputs to the outputs. Non-parametric estimation techniques, such as nearest neighbor estimation techniques, can be used for comparing the sample image to the training set images in order to determine the output parameter.

According to another aspect of the invention, a tree-structure vector quantization technique is used to organize the images in the training set in order to reduce processing time and indexing costs. Each of the images, or data points, in the training set is a leaf of the tree. When an input image is received, the tree is traversed to determine a closest data point in the training set. The output parameter of the closest data point in the training set, i.e., a corresponding pose, is outputted.

According to another aspect of the invention, in building the tree structure, k-means clustering (with K=2) is used to separate the data points iteratively into each side of the tree nodes. Alternatively, according to another aspect of the invention, principal components analysis (PCA) is used to find a direction of maximal variation for the data points assuming an n-dimensional space. The data points are then separated into halves in the direction of maximal variation.

According to another aspect of the invention, a cropping window is used to select a portion of an image in order to limit the image to the face. The training set includes images with faces offset or at different distances in order to determine adjustments to the cropping window.

DETAILED DESCRIPTION

Figure 1:
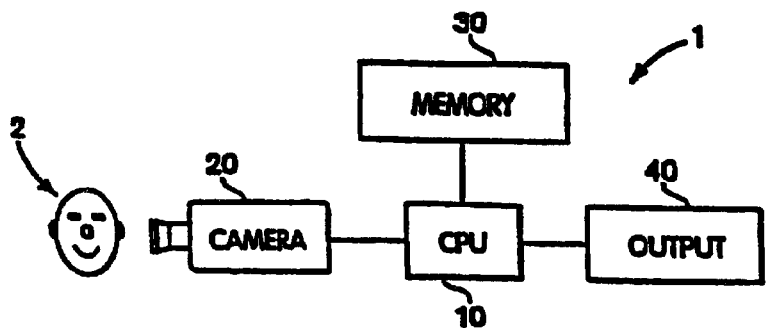
FIG. 1 illustrates hardware implementing the present invention.

As illustrated in FIG. 1, the present invention can be implemented in a system 1 including a camera 20, central processing unit (CPU) 10, memory 30 and output 40. The camera 20 is used to generate an image of a subject 2, such as a driver of an automobile. According to an embodiment of the invention, the sample image would be limited to the face of the subject. However, the sample image may include other portions of the subject, and the system may be used to determine more than just face position and direction. The camera 20 provides the digitized sample image to the CPU 30 for processing. Preferably, the camera 20 provides a series of sample images over time. Each image is separately processed to determine a pose. A memory 30 is connected to the CPU 20 to store the image data while it is processed. In addition, the memory 30 includes image data for the images from the training set and the output pose corresponding to each image in the training set. Furthermore, the program steps for operating the CPU 20 to analyze the sample image from the camera are stored in the memory 30. The CPU 20 also includes an output 40 for indicating the pose determined for the inputted image. The output 40 could be provided to other processing circuitry for determining whether a hazardous condition is present and whether to alert a driver. The use for the output depends upon the system in which the pose determining system is operating.

The pose determining system uses a training set of images as a basis for determining the pose. Each image in the training set is associated with a specific pose. The system then determines the closest image in the training set to the sample image. The pose of the closest image is outputted as the pose for the sample image. Different mechanisms can be used for generating the images in the training set.

Figure 2:
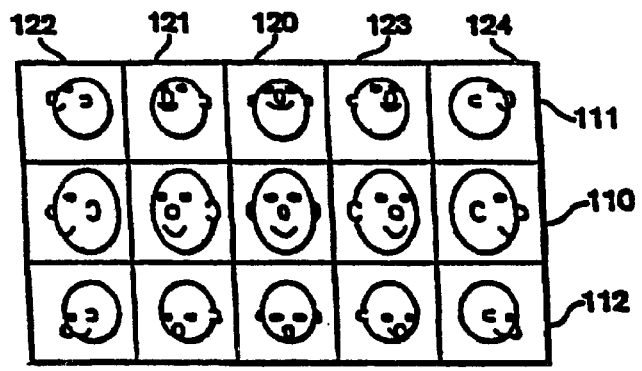
FIG. 2 illustrates different pose positions for the training set.
Figure 3:
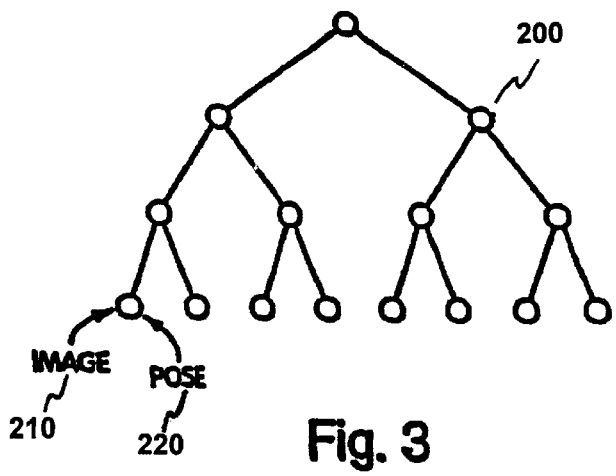
FIG. 3 illustrates the tree-structured vector quantization organization of the images in the training set.

According to an embodiment of the present invention, the training set is obtained by taking pictures of various subjects at different poses and saving them in memory 30 as images. The pose associated with each respective image is also stored. FIG. 2 illustrates a set of images at different poses for use in determining the direction the head is facing. Each row represents a vertical displacement of the pose and each column represents a horizontal displacement. For example, the subject in row 110 has no vertical tilt to the face. In row 111, the subject is looking upward and in row 112, the subject is looking downward. In column 120, the subject is facing forward. In columns 121 and 122, the subject is looking to the left and in columns 123 and 124, the subject is looking towards the right. Fifteen different poses are associated with these images corresponding to the vertical and horizontal position of the head. In order to generate the images, the subject is photographed while looking in the direction represented by each pose. In order to accommodate different drivers, appearances, and lighting conditions, different subjects would be photographed under different conditions to generate images. Each subject and condition is photographed at all of the fifteen poses.

Figure 4:
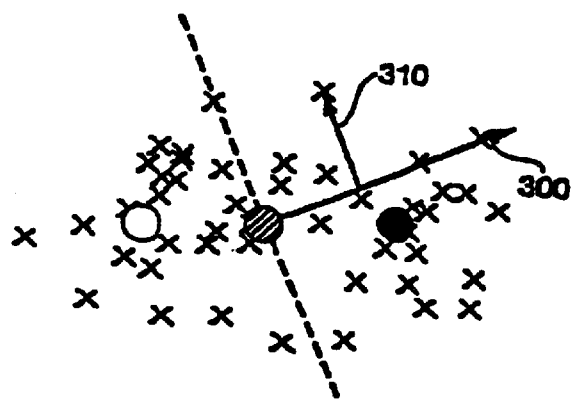
FIG. 4 illustrates one method for dividing images in the training set in order to create the tree structure.

In order to efficiently search through the images in the training set in comparing with a sample image, an index needs to be used with a large set. In order to reduce indexing cost, in one embodiment, the images are organized using a tree-structured vector quantization. At each node 200 in the tree, a code is stored. Indexing involves recursively choosing the child node which has the nearest code to the code of the sample image. The process is repeated until a leaf is reached. The leaf includes one of the images 210 from the training set and the corresponding pose 220 information. In creating the tree-structured vector quantization format, each image is considered to be a vector in n dimensional space, where n is the number of pixels in the image. Thus, each image is an n dimensional code. Techniques for building a tree-structured code book are generally known, follow a recursive form, and are intuitively easy to construct. According to one procedure, the images in the training set are separated into two parts. K-means clustering (K=2) can be used for separating the images into parts. Alternatively, PCA can be used to find the direction of maximal variation of the data sets in the n dimensional space. Each image is then projected onto a weight relative to the direction of maximal variation. As illustrated in FIG. 4, each data point representing an image has a distance 310 from the direction of maximal variation 300. Each data point or image is then assigned to one the two children depending on whether the weight is positive or negative. The process is repeated until the tree-structure is completely formed.

Once the tree-structure is formed, it is stored in the memory 30. When a sample image is obtained by the camera 20, it is also considered a vector in n dimensional space. The code for that vector is used and compared with the nodes in the tree to traverse the tree. The tree is traversed to the leaf node having a code closest to the code for the sample image. The pose 220 corresponding to the image 210 of the leaf node is then outputted through the output 40.

Figure 5:
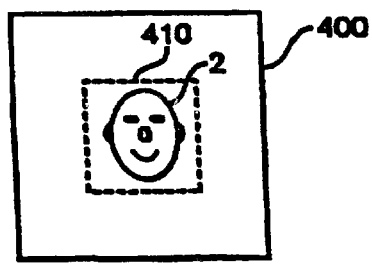
FIG. 5 illustrates a cropping window.
Figure 6:
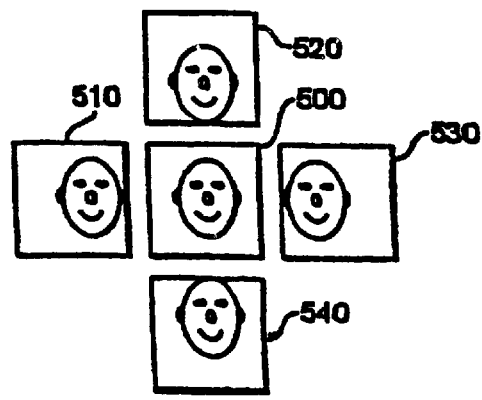
FIG. 6 illustrates images in the training set for adjustment of the cropping window.

In addition to changing head direction, the driver may also spatially move relative to the camera. Since the faces in the images of the training set are centered, erroneous results may occur for images with a face which is not centered. Such movements may be accommodated through the use of a cropping window and additional images in the training set. As illustrated in FIG. 5, a cropping window 410 can be selected out of an image 400 taken by the camera. Preferably, the cropping window 410 is placed so that the face 2 of the subject is centered relative to the cropping window. As the subject moves spatially with respect to the camera image 400, the cropping window 410 needs to move so that the face remains centered. In order to determine movement of the cropping window, additional images are included in the training set as illustrated in FIG. 6. Image 500 represents a subject facing forward without any vertical tilt. This would correspond to the image in column 120 and row 110 of FIG. 2. In addition to this centered image, the training set includes additional images having the same pose with offsets to the right 510, bottom 520, left 530, and top 540. These offset images are included for each pose, subject, and lighting condition. The tree-structure vector quantization method is used with a training set including these additional images. If one of the offset images is determined to be the proper match for the sample image, then the cropping window 410 is moved in order to center the face for the next sample image. For example, if image 510 were the closest image, the cropping window would be moved to the right in order to more closely approximate image 500 for the next sample. FIG. 6 illustrates offsets in four directions. Additional offsets could also be used, such as the diagonal offsets. Furthermore, the size of the cropping window can be adjusted by including images which have larger or smaller faces relative to the image size. Thus, the system can accommodate movement of the subject toward or away from the camera 20. Other types of transformations could also be accomodated through use of the cropping window. For example, tilt of the head could be compensated for by changing the tilt of the cropping window.

In one implemented embodiment, the training set includes eleven subjects, at 15 poses, with 7 images per pose (those shown in FIG. 6, and a larger and smaller face image) for tracking in position and scale. Each image consists of 40×30 pixels with one byte representing the gray scale level of the pixel. This system requires 1.4 Mb of storage for the training set. Once the tree-structure is developed, the system is able to traverse the tree to determine a pose for persons not in the training set on a 1995 SGI Indy workstation at the rate of 11 frames per second. This example only used one lighting condition. Preferably, additional subjects would be used in the training set, with additional lighting conditions. Additional memory space may be saved by reducing the size of the images ill the training set. Although a 40×30 pixel image was used in the tested embodiment, the size of the heads were much smaller, roughly 16×16 pixels. Furthermore, the processing time for additional images would not increase greatly. With the tree-structure, the number of comparisons to find a leaf node is log, (number of images). Thus, each time the number of images in the training set doubles, a single additional comparison is required. A training set using 25 subjects under 4 lighting conditions would require 2.6 Mb storage space, and 6 comparisons to traverse the tree to obtain the closest image and pose. Thus, the storage and processing requirements meet the objectives of being quick and economical.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A method of identifying an image characteristic, comprising the steps of:
   storing a tree structured code having coding representing each of a plurality of training images;
   comparing coding representing a sample image, not included in the plurality of training images, to the tree structured code to identify the training image coding in the structured tree code closest to the sample image coding; and
   identifying a characteristic of the sample image based upon the training image represented by the closest training image coding.

2. A method according to claim 1, wherein the characteristic is a pose.

3. A method according to claim 1, wherein the plurality of training images include images having at least one of different subjects and different lighting conditions.

4. A method according to claim 1, further comprising the step of:
   determining if an alarm is to be sounded based upon the identified characteristic.

5. A method according to claim 1, wherein the plurality of training images include images of a plurality of different individual subjects of a particular type and the sample image includes an image of a subject of the particular type not included in the plurality of different subjects.

6. A method according to claim 1, wherein the training image coding representing each of the plurality of training images in the tree structured code is n dimensional coding, where n is the number of pixels in that image.

7. A method according to claim 1, wherein the n dimensional coding includes a vector quantization value corresponding to a vector representing the applicable image in n dimensional space.

8. A method according to claim 6, wherein the sample image coding is n dimensional coding.

9. A method according to claim 8, wherein the n dimensional coding includes a vector quantization value corresponding to a vector representing one of (i) the applicable training image in n dimensional space and (ii) the sample image, in n dimensional space.

10. A method according to claim 1, further comprising the step of:
    separating the plurality of training images;
    wherein the coding representing each of the plurality of training images within the tree structured code is related to the other coding representing other of the plurality of training images within the tree structured code based on the separation of the plurality of training images.

11. A method according to claim 1, further comprising the steps of:
    determining a direction of maximum variation for the plurality of training images; and
    determining a distance from the direction of maximum variation for each of the plurality of training images;
    wherein the coding representing each of the plurality of training images within the tree structured code is related to the other coding representing other of the plurality of training images within the tree structured code based on the determined distance for the training image represented by that coding.

12. A method according to claim 1, further comprising the steps of:
    determining a direction of maximum variation for the plurality of training images; and
    determining a direction for each of the plurality of training images with respect to the direction of maximum variation;
    wherein the coding representing each of the plurality of training images within the tree structured code is related to the other coding representing other of the plurality of training images within the tree structured code based on the determined direction for the training image represented by that coding.

13. A method according to claim 1, further comprising the step of:
    locating a window within the sample image, the window being located to have a subject, depicted in the sample image contained within the window;
    wherein the coding representing the sample image represents only a portion of the sample image within the window.

14. A method according to claim 13, wherein the window is located so as to center the subject within the window.

15. A method according to claim 13, wherein the sample image is one of a plurality of sample images, each of the plurality of sample images having the subject depicted in that sample image, and further comprising the step of:
    locating the window within each of the plurality of sample images to have the subject depicted in that sample image contained within the window.

16. A method according to claim 15, wherein the window is located in each of the plurality of sample images so as to have the subject contained at approximately a same position within the window located within each of the sample images.

17. A method according to claim 15, wherein:
    the plurality of training images include at least one training subject depicted at different locations in the plurality of training images;
    the window is located within at least one of the plurality of sample images based on the at least one training subject being depicted at a particular one of the different locations in the plurality of training images.

18. A method according to claim 1, wherein the plurality of training images include a training subject depicted in different positions in the plurality of training images, and the sample image is one of a plurality of sample images, each of the plurality of sample images having a subject depicted in that sample image, and further comprising the steps of:

positioning a window within a first of the plurality of sample images, wherein with the window so positioned the subject in the first sample image is at a first position within the window which is different than a predetermined position; and positioning the window within a second of the plurality of sample images, the window being positioned within the second sample image differently than positioned within the first sample image, the difference in the positioning corresponding to the difference between the first position and the predetermined position, wherein with the window positioned within the second sample image the subject in the second sample image is at the predetermined position within the window;

wherein the coding representing the second sample image represents only a portion of that sample image within the window.

19. A method according to claim 18 wherein:

the plurality of training images include a training subject depicted in different positions within the plurality of training images; and the window is positioned within the second sample image based on the training subject being at a second position within the plurality of training images which corresponds to the first position.

20. A method according to claim 18, wherein the window is positioned differently within the second sample image with respect to one of (i) window location, (ii) window orientation, and (iii) window size.

21. A system for identifying an image characteristic, comprising:

a memory configured to store a tree structured code having coding representing each of a plurality of training images; and a processor configured to process coding representing a sample image, not included in the plurality of training images, to identify a characteristic of the sample image by traversing the tree structured code to locate the training image coding in the structured tree code which is closest to the sample image coding.

22. A system according to claim 21, wherein:

the processor is further configured to position a window within the sample image so as to have a subject depicted in the sample image disposed within the window; and the coding representing the sample image represents only that portion of the sample image within the window.

23. A system according to claim 22, wherein:

the sample image is one of a plurality of sample images, each of the plurality of sample images having the subject depicted in that sample image; and the processor is further configured to position the window within each of the plurality of sample images to have the subject depicted in that sample image disposed within the window.

24. A system according to claim 23, wherein:

the processor is further configured to position the window within each of the plurality of sample images so as to have the subject disposed at approximately a same position within the window.

25. A system according to claim 23, wherein:

the plurality of training images include at least one training subject disposed at different positions in the plurality of training images; and the window is located within at least one of the plurality of sample images based on the training subject being disposed at a particular one of the different positions within the plurality of training images.

26. A system according to claim 21, wherein:

the plurality of training images include a training subject disposed at different positions in the plurality of training images;

the sample image is one of a plurality of sample images, each of the plurality of sample images having a sample subject depicted in that sample image;

the processor is further configured (i) to position a window within a first of the plurality of sample images such that the sample subject in the first sample image is at a first position within the window which is different than a predefined position, and (ii) to position the window within a second of the plurality of sample images so as to be positioned with the sample subject in the second sample image at the predetermined position, based upon the difference between the first position and the predetermined position; and the memory is further configured to store only the coding representing that portion of the each of the plurality of sample images within the window.

27. A system according to claim 26, wherein:

the plurality of training images include a training subject disposed at different positions in the plurality of training images; and the processor is further configured to position the window within the second sample image based on the training subject being at a second position, corresponding to the predefined position, within the plurality of training images.

* * * * *